United States Patent [19]

Satoh et al.

[11] 4,097,726
[45] Jun. 27, 1978

[54] TAPE ENDING INDICATOR FOR TAPE RECORDER

[75] Inventors: Ken Satoh, Hachioji; Yoshio Tomizawa, Tama, both of Japan

[73] Assignee: Olympus Optical Co., Ltd., Tokyo, Japan

[21] Appl. No.: 583,267

[22] Filed: Jun. 3, 1975

[30] Foreign Application Priority Data

Jun. 11, 1974  Japan .............................. 49-67869[U]

[51] Int. Cl.² .................... G06M 1/27; G11B 19/06; G11B 15/54
[52] U.S. Cl. ............................... 235/92 MP; 242/57; 242/191
[58] Field of Search ............... 242/191, 57, 75.51, 242/75.45, 75.44; 340/259, 260; 360/137; 235/151.32, 92 R, 92 A, 92 FQ, 92 CA, 92 PK, 92 V, 132 N, 92 DN, 92 PE, 92 PD, 92 MT, 92 MS, 92 MP, 92 CT, 92 EV

[56] References Cited

U.S. PATENT DOCUMENTS

| 3,171,952 | 3/1965 | Brown | 235/92 V |
|---|---|---|---|
| 3,564,219 | 2/1971 | Mutziger | 242/191 |
| 3,730,453 | 5/1973 | Hotchkiss et al. | 242/191 |
| 3,779,483 | 12/1973 | Inoue | 242/191 |
| 3,866,120 | 2/1975 | Ford | 235/92 FQ |
| 4,001,552 | 1/1977 | Muller | 235/92 CA |

*Primary Examiner*—George F. Mautz
*Attorney, Agent, or Firm*—Ostrolenk, Faber, Gerb & Soffen

[57] ABSTRACT

A tape ending indicator comprises a flip-flop circuit responsive to a pulse signal derived from a rotating tape for producing a pulse of an increased width, which is applied to one input of an AND circuit which also receives count pulses of a given, constant frequency from a suitable source. The number of count pulses which are contained in the output signal from the AND circuit is counted in order to detect a change of the count above a first value or below a second value as the diameter of the roll of the taken up tape increases or decreases, thereby indicating the ending of the tape.

2 Claims, 3 Drawing Figures

TAPE ENDING INDICATOR FOR TAPE RECORDER

BACKGROUND OF THE INVENTION

The invention relates to a tape ending indicator for tape recorders, and more paricularly to an apparatus for indicating an ending of tape running or the fact that the end of tape running is reached or approached.

In a tape recorder, it is necessary to check for the running of a magnetic tape and to indicate to the user that an end of tape running is reached or approached, since otherwise a loss of important information to be recorded may result as a consequence of a continued recording operation without noticing the fact that the end of tape running is reached or approached.

Various alarm devices for detecting and indicating to the user a tape end have been proposed. In one example, an electrically conductive foil is applied to a terminal end of the tape so that it can be electrically detected. In another example, a change in the tension of the tape which occurs when a tape end is reached is utilized for mechanical detection. However, conventional alarm devices are incapable of detecting a tape end before the running tape reaches its end. This involves a time delay in replacing the tape since the tape replacement is only possible after the knowledge of the termination of the tape running. As a result, the recording is interrupted for a while. In order to avoid such drawback, it is desirable to provide an alarm or a corresponding indication that the end of the running tape is being closely approached.

SUMMARY OF THE INVENTION

It is an object of the invention to provide a tape ending indicator for tape recorder which checks a tape running by sensing a pulse signal derived from a rotating tape reel system during the tape running and which utilizes a change in the time interval between the pulse signals produced which occur as a result of a change in the diameter of the roll of the tape being taken up for indicating the fact that the tape end is approached or reached.

In accordance with the invention, the pulse signal is derived from the associated tape reel system during the tape running, and a simple electrical circuit of conventional design is utilized to provide an indication that the end of the running tape is approached or reached.

DETAILED DESCRIPTION OF PREFERRED EMBODIMENT

Figure 1:
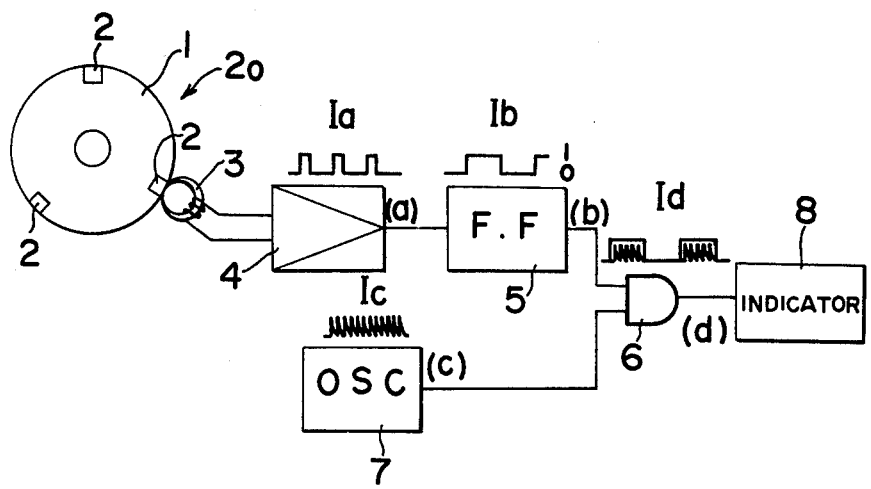
FIG. 1 is a block diagram of the tape ending indicator for tape recorder constructed in accordance with one embodiment of the invention.

Referring to FIG. 1, a rotary member 1 which rotates together with a take-up reel or a supply reel is peripherally provided with magnets 2 arranged at equal intervals. In the example shown, three magnets are disposed around the periphery of the member 1. A magnetic sensing head 3 is disposed adjacent to the periphery of the rotating member 1, and produces a pulse signal as the member 1 rotates together with the associated reel. In this manner, the components 1, 2 and 3 collectively constitute a pulse generator 20. The pulse signal from the generator 20 is amplified by an amplifier 4 and is applied as a pulse signal $Ia$ to a flip-flop circuit 5 from the output terminal ($a$) of the amplifier. The flip-flop circuit 5 produces an output signal $Ib$ which is in the form of a square wave, which is applied from its output terminal ($b$) to one input of an AND circuit 6.

The AND circuit 6 also receives a count pulse $Ic$ from a count pulse generator 7 at its other input terminal. The generator 7 is formed by a pulse oscillator which produces the count pulse $Ic$ of a fixed frequency at its output terminal ($c$). Thus, when both the output signal $Ib$ and the count pulse $Ic$ are applied to the AND circuit, the latter produces an output signal $Id$ at its output terminal ($d$), which is applied to an indicator 8. The indicator 8 functions to count the number of count pulses contained in the output signal $Id$ from the AND circuit 6 and to provide an indication when the number of count pulses changes beyond a given range. In the present embodiment, the rotary member 1 is adapted to rotate together with a take-up reel, so that its rotation will be continued with a gradually decreasing rate as the tape is taken up on the reel and the diameter of the roll thereof increases.

In operation, during the initial phase of taking up the tape on the take-up reel, the member 1 which rotates together with the take-up reel will rotate with a relatively high speed, so that the pulses produced by the head 3 will have relatively short intervals. As indicated in the left-hand portion (A) of the uppermost curve ($a_O$) in FIG. 2, the amplified pulse from the output terminal ($a$) of the amplifier 4 will have a repetition period $T_1$ which is relatively short. The flip-flop circuit 5 converts the pulse signal $Ia$ to the square wave $Ib$ having a pulse width $T_1$, as shown in the left-hand portion (A) of the second curve ($b_O$), before it is applied to the AND circuit 6. The count pulse $Ic$ produced by the generator 7 is shown at ($c_O$) of FIG. 2 and will appear at the output terminal ($d$) of the AND circuit 6 only when the signal $Ib$ assumes a "1" level, thereby producing the output waveform, as shown at ($d_O$) in the left-hand portion (A) of FIG. 2, for application to the indicator 8. As mentioned previously, the indicator counts the number of count pulses contained in the signal $Id$, and produces no indication when the number remains within a given range, indicating that a sufficient length of the tape is available for recording or play-back.

Figure 2:
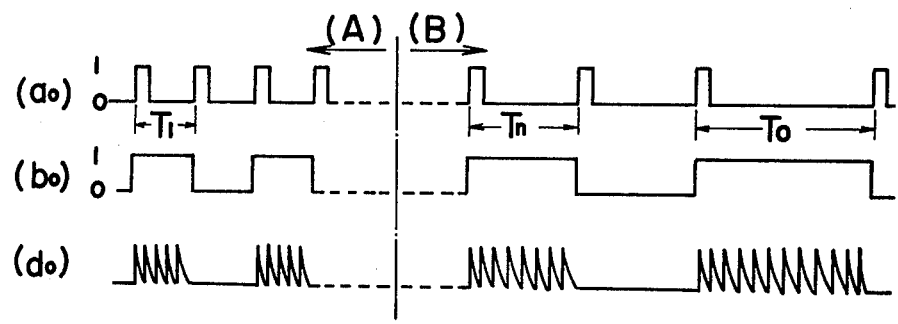
FIG. 2 graphically shows various waveforms appearing in the circuit shown in FIG. 1.

As the tape running is continued, the diameter of the roll of the tape taken up on the take-up reel increases gradually. The increase of the roll diameter accompanies a gradual reduction in the speed of rotation of the take-up reel and the rotating member 1, so that the pulse repetition period of the pulse signal produced by the head 3 varies or increases as shown at ($a_O$) in the right-hand portion (B) of FIG. 2. As a consequence, the pulse width of the square wave signal $Ib$ increases as does the number of count pulses contained therein. However, the indicator 8 produces no indication while the number remains below a given value. When the terminal end of the tape which is wound on the supply reel is approached, the number of count pulses contained in the output signal $Ib$ will reach the given value, whereupon the indicator 8 operates to provide an indication. By way of example, the illustration in FIG. 2 is such that the indicator 8 will produce an indication when the number of count pulses contained within a pulse repetition period of the signal from the head 3 or the pulse width $T_O$ from the flipflop circuit 5 reaches 12. This warns the user of the tape recorder that the terminal end of the running tape is reached, thus allowing the tape to be replaced in order to avoid the loss of important information. It will be noted that the indication by the indicator 8 may be in any form including a continuous illumination, flashing or extinction of a light emitting element. While in the above embodiment, the indication of the indicator is provided when the terminal end of the tape is reached, it is also useful to provide a warning indication when the terminal end of the tape is approached. This allows the user of the tape recorder to prepare a new tape. Such a warning indication can be achieved by establishing a smaller value, for example, 8 in the present example, for the threshold value at which the indicator 8 operates. This is illustrated in the right-hand portion (B) of FIG. 2 for the pulse width $T_n$ of the output signal from the flipflop circuit 5.

In the above description, the rotating member 1 is assumed to rotate with the take-up reel. However, it will be appreciated that the member 1 may be disposed for rotation together with the supply reel. In this instance, the pulse repetition period of the pulse signal produced by the head 3 varies in the opposite direction, namely, reduces as the tape running proceeds. As a consequence, the threshold value of the count which is established in the indicator must be chosen to a minimum possible value, and a down-counter must be used within the indicator.

Figure 3:
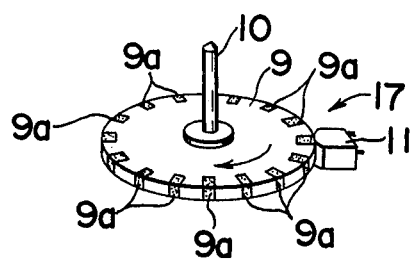
FIG. 3 is a perspective view of an example of count pulse emitter.

In the above embodiment, the rotating member 1 is a disc which rotates with the reel, and the magnets 2 are disposed around the periphery thereof at equal intervals. However, the magnets 2 may be directly applied to the reel itself, provided consideration is paid so as to avoid interference with the magnetic tape contained therein. The only requirement is that a pulse signal indicating the condition of the tape running be derived from the rotating tape reel system.

Where a fluctuation in the supply voltage or a temperature change of the tape recorder is likely to occur, the frequency of the count pulses produced by the pulse oscillator may be adversely influenced thereby, causing a premature warning indication when the tape end is not reached or approached. In this connection, it is desirable that the count pulse be derived from a portion of the tape transport system, such as a capstan for feeding the tape at a uniform speed, a flywheel integral therewith or a pinch roller. FIG. 3 shows a count pulse generator 17 which derives the count pulse Ic from a flywheel 9 integral with a tape transport capstan 10. Specifically, the generator 17 comprises a plurality of magnets 9a embedded in the periphery of the flywheel 9 at an equal and relatively close interval, and a magnetic head 11 disposed adjacent to the periphery of the flywheel 9 for producing the count pulse Ic in response to the flux from the magnets 9a. Such an arrangement prevents an adverse influence of a voltage flue transport capstan 10. Specifically, the generator 17 comprises a plurality of magnets 9a embedded in the periphery of the flywheel 9 at an equal and relatively close interval, and a magnetic head 11 disposed adjacent to the periphery of the flywheel 9 for producing the count pulse Ic in response to the flux from the magnets 9a. Such an arrangement prevents an adverse influence of a voltage fluctuation or a temperature change upon the frequency of the count pulses, thus avoiding an erroneous counting operation.

What is claimed is:

1. A tape ending indicator for a tape recorder, comprising:

a rotating member operatively connected to a supply or take-up reel of a tape recorder and adapted to rotate at a speed proportional to the rotational speed of said supply or take-up reel;

a plurality of magnets mounted on and spaced at equal intervals along the periphery of said rotating member;

a magnetic head disposed adjacent to the periphery of said rotating member for generating a pulse signal each time one of said magnets passes said magnetic head;

a flip-flop circuit responsive to said pulse signal, the output of said flip-flop changing each time said pulse signal is applied thereto;

a count pulse generator for producing count pulses of a fixed frequency, the frequency of said count pulses being substantially greater than the frequency of said pulse signals generated by said magnetic head;

gate means connected to said flip-flop circuit and said count pulse generator for passing said count pulses whenever said gate means is enabled by said output of said flip-flop circuit whereby the number of count pulses passed by said gate means is proportional to the frequency of pulses generated by said magnetic head;

indicator means for counting the number of pulses passed by said gate means and for providing an indication that a terminal end of a tape is approaching when the number of count pulses passed by said gate means reaches a predetermined value.

2. A tape ending indicator for tape recorder according to claim 1 in which the count pulse generator comprises a pulse oscillator which produces count pulses of a fixed frequency.

* * * * *